C. P. WILHELM.
Thill Coupling.
No. 23,055.
Patented Feb. 22, 1859.
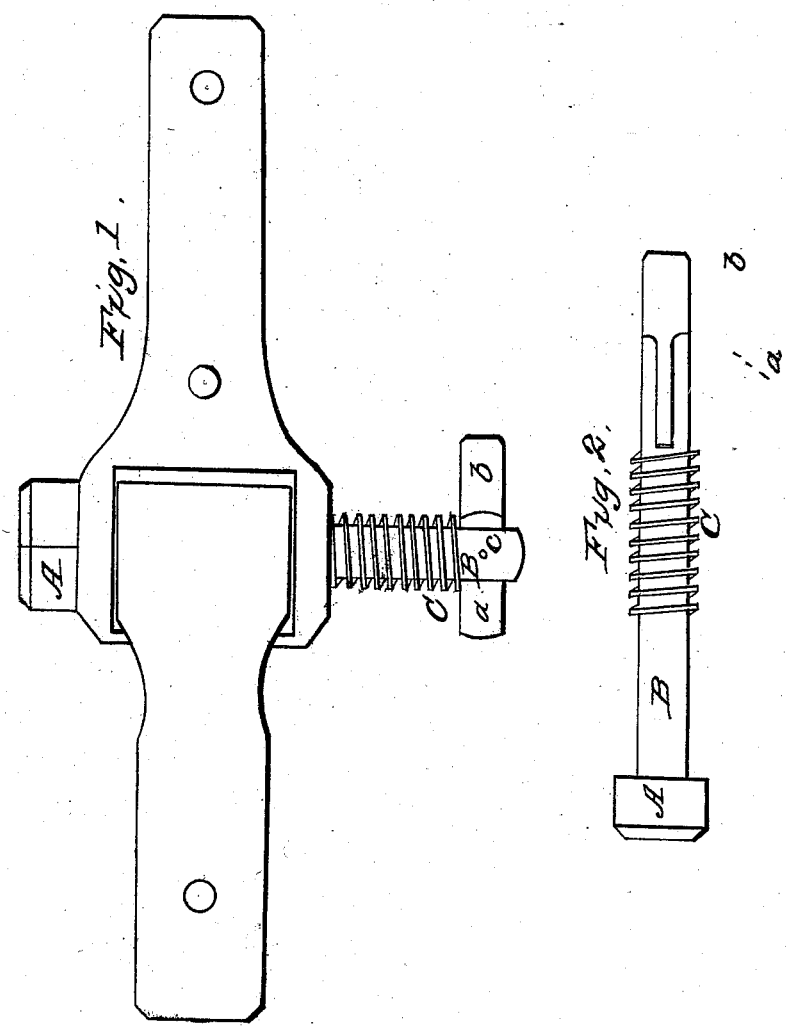

UNITED STATES PATENT OFFICE.

C. P. WILHELM, OF BRIDGEPORT, PENNSYLVANIA.

KEY-BOLT FOR ATTACHING CARRIAGE-THILLS.

Specification of Letters Patent No. 23,055, dated February 22, 1859.

*To all whom it may concern:*

Be it known that I, C. P. WILHELM, of Bridgeport, in the county of Montgomery and State of Pennsylvania, have invented a new and useful Improvement in Bolts for Carriages; and I do hereby declare the following to be a full and exact description thereof.

The nature of my invention consists in the mode hereinafter described for fastening shafts and poles to carriages so that they may be quickly and easily removed or put in place, and at the same time, be so secured that they cannot by any possible mischance get loose and come out from their places; there being no nuts to turn and work loose and come off.

Figure 1 is a view showing the manner in which the bolt is used to fasten the two parts of a hinge together. Fig. 2 shows the bolt detached from its office.

A, Figs. 1 and 2 is the head of the bolt.

B is the shank, which is made longer than the opening through which it is to pass, and has at its extremity a slot or mortise to receive the tongue or tenon $a$ of the swinging key $b$ which is jointed to the shank B at $c$. The key $b$ is of the same shape as the shank B, and may be turned upon the joint $c$ so as to be a prolongation of the shank; the tenon $a$ extending up into the slot in the end thereof.

C is a spiral spring placed around the shank B, between the key $b$ and clip $c'$ for the bolt to pass through, for the purpose of keeping the head of the bolt to its bearing and preventing the key $b$ from getting out of the position shown in Fig. 1.

When this bolt is to be used, the key $b$ is brought in line with the shank B, is passed through the bolt hole, the spiral spring $c$, passed on to the shank and forced up past the upper end of the slot or mortise, so as to allow the tenon $a$ to swing out, when the key $b$ is forced with the tenon to a position at right angles with the shank B; the pressure of the spring $c$, against the key and its tenon preventing any change of position, and from becoming loose as with a nut and screw, as well as from rattling, as the pressure of the spring will always keep the head of the bolt to its bearing and hold it to its place.

I do not claim as new of themselves either the key bolt or the spiral spring, but What I do claim as new, and desire to secure by Letters Patent, is:

The manner described of fastening shafts, and poles to carriages, by the arrangement of the bolt B, $b$, spiral spring C, and clips $c'$ arranged and operating as set forth.

C. P. WILHELM.

Witnesses:
T. G. CLAYTON,
J. C. CLAYTON.